(12) United States Patent
Skelly et al.

(10) Patent No.: US 7,391,731 B1
(45) Date of Patent: Jun. 24, 2008

(54) METHOD FOR DETERMINING BEST PATH

(75) Inventors: Paul A. Skelly, Needham, MA (US); Ajay Joseph, Lexington, MA (US)

(73) Assignee: iBasis, Inc., Burlington, MA (US)

( * ) Notice: Subject to any disclaimer, the term of this patent is extended or adjusted under 35 U.S.C. 154(b) by 1059 days.

(21) Appl. No.: 10/094,671

(22) Filed: Mar. 7, 2002

(51) Int. Cl.
*H04J 1/16* (2006.01)

(52) U.S. Cl. .................................. 370/238; 370/351

(58) Field of Classification Search ............... 370/238, 370/252, 253, 351, 349, 389, 255, 394, 395.52, 370/516, 471; 709/241, 238
See application file for complete search history.

(56) References Cited

U.S. PATENT DOCUMENTS

| | | | |
|---|---|---|---|
| 5,452,294 A * | 9/1995 | Natarajan | 370/351 |
| 5,790,546 A | 8/1998 | Dobbins et al. | 370/400 |
| 6,084,858 A | 7/2000 | Matthews et al. | |
| 6,363,056 B1 * | 3/2002 | Beigi et al. | 370/252 |
| 6,631,119 B1 * | 10/2003 | Mawhinney et al. | 370/252 |
| 6,678,267 B1 * | 1/2004 | Anandakumar et al. | 370/356 |
| 6,721,334 B1 * | 4/2004 | Ketcham | 370/473 |
| 6,868,094 B1 * | 3/2005 | Bordonaro et al. | 370/516 |

OTHER PUBLICATIONS

"An Introductions to NeTrueQoSJ Demo," *NeTrue Communications, Inc.*, V2.1: 1-20 (Feb. 2000).

Internet Engineering Task Force RFC 1773 [online], Mar. 1995 [retrieved on Oct. 9, 2000]. Retrieved from the Internet <URL: http://blitzen.canberra.edu.au/RFC/rfc/rfc1773.html>.
Internet Engineering Task Force RFC 1774 [online], Mar. 1995 [retrieved on Oct. 9, 2000]. Retrieved from the Internet <URL: http://blitzen.canberra.edu.au/RFC/rfc/rfc1774.html>.
Internet Engineering Task Force RFC 1772 [online], Mar. 1995 [retrieved on Oct. 9, 2000]. Retrieved from the Internet <URL: http://blitzen.canberra.edu.au/RFC/rfc/rfc1772.html>.
Internet Engineering Task Force RFC 1771 [online], Mar. 1995 [retrieved on Oct. 9, 2000]. Retrieved from the Internet <URL: http://blitzen.canberra.edu.au/RFC/rfc/rfc1771.html>.
Internet Engineering Task Force RFC 768 [online], Aug. 1980 [retrieved on Jan. 20, 2001]. Retrieved from the Internet <URL: http://blitzen.ise.canberra.edu.au/RFC/rfc/rfc768.html>.

(Continued)

*Primary Examiner*—Chi Pham
*Assistant Examiner*—Alexander O. Boakye
(74) *Attorney, Agent, or Firm*—Ked & Associates, LLP (57) ABSTRACT

Multi-packet probes are forwarded from a source to a destination through different paths. The efficiencies of the different paths are then determined by comparing information collected from the probes arriving at the destination. The information can include sequence information such as a sequence number. Packet loss information, such as the ratio of lost packets to sent packets, can be determined based on the sequence information. Alternatively, a histogram of numbers of sequential packets lost can be determined. The information can also include timing information, such as a timestamp, from which relative latency based on the timing information across different paths can be determined. In addition, jitter for each path based on the timing information for that path can also be determined based on the timing information.

27 Claims, 5 Drawing Sheets

OTHER PUBLICATIONS

Internet Engineering Task Force RFC 1889 [online], Jan. 1996 [retrieved on Jan. 20, 2001]. Retrieved from the Internet <URL: http://blitzen.ise.canberra.edu.au/RFC/rfc/rfc1889.html>.

Savage, Stefan, et al., "Detour: Informed Internet Routing and Transport," *IEEE MICRO*, pp. 50-59 (Jan.-Feb. 1999).

Collins, Andy, "The Detour Framework for Packet Rerouting," pp. 1-20 (Oct. 29, 1998).

Kim, D.H., et al., "A New Routing Control Technique Using Active Temporal Data Management," *J. of Systems and Software*, 51: 37-48 (2000).

"Internet Service Exchange: A Network Better by Design," *AboveNet Communications Inc.* (1999).

Perkins, M.E., et al., "Speech Transmission Performance Planning in Hybrid IP/SCN Networks," *IEEE Communications Magazine*, pp. 126-131 (Jul. 1999).

* cited by examiner

| Destination Address | Source Exit Port | Destination Input Port |
|---|---|---|
| A1 | C | A |
| A2 | D | A |
| B1 | C | B |
| B2 | D | B |

METHOD FOR DETERMINING BEST PATH

BACKGROUND OF THE INVENTION

Long distance telephone calls are commonly routed over the Internet. While the Internet is fast, relatively inexpensive and usually reliable, it also presents special problems for voice applications.

For example, once a voice packet has been sent, the sender has no control over the path the packet will take. While multiple routes are typically available, due to various parameters and conditions of systems along each path, some paths will provide better performance than others, that is, some paths will be more efficient than others in delivering packets in timely fashion and with few lost packets.

These qualities are particularly important with voice applications because voice signals or messages, to be intelligible, place real-time constraints on the system. Packets must be delivered within reasonable times of each other so that the full voice message can be re-assembled at the receiving end. Furthermore, small noticeable delays are irritating to users, while larger delays make a system unusable.

RFC 1771 from the Internet Engineering Task Force (IETF) describes the Internet as a collection of arbitrarily connected Autonomous Systems (ASs). An AS is a set of routers under a single technical administration, using an interior gateway protocol and common metrics to route packets within the AS and using an exterior gateway protocol to route packets to other ASs.

Figure 1:
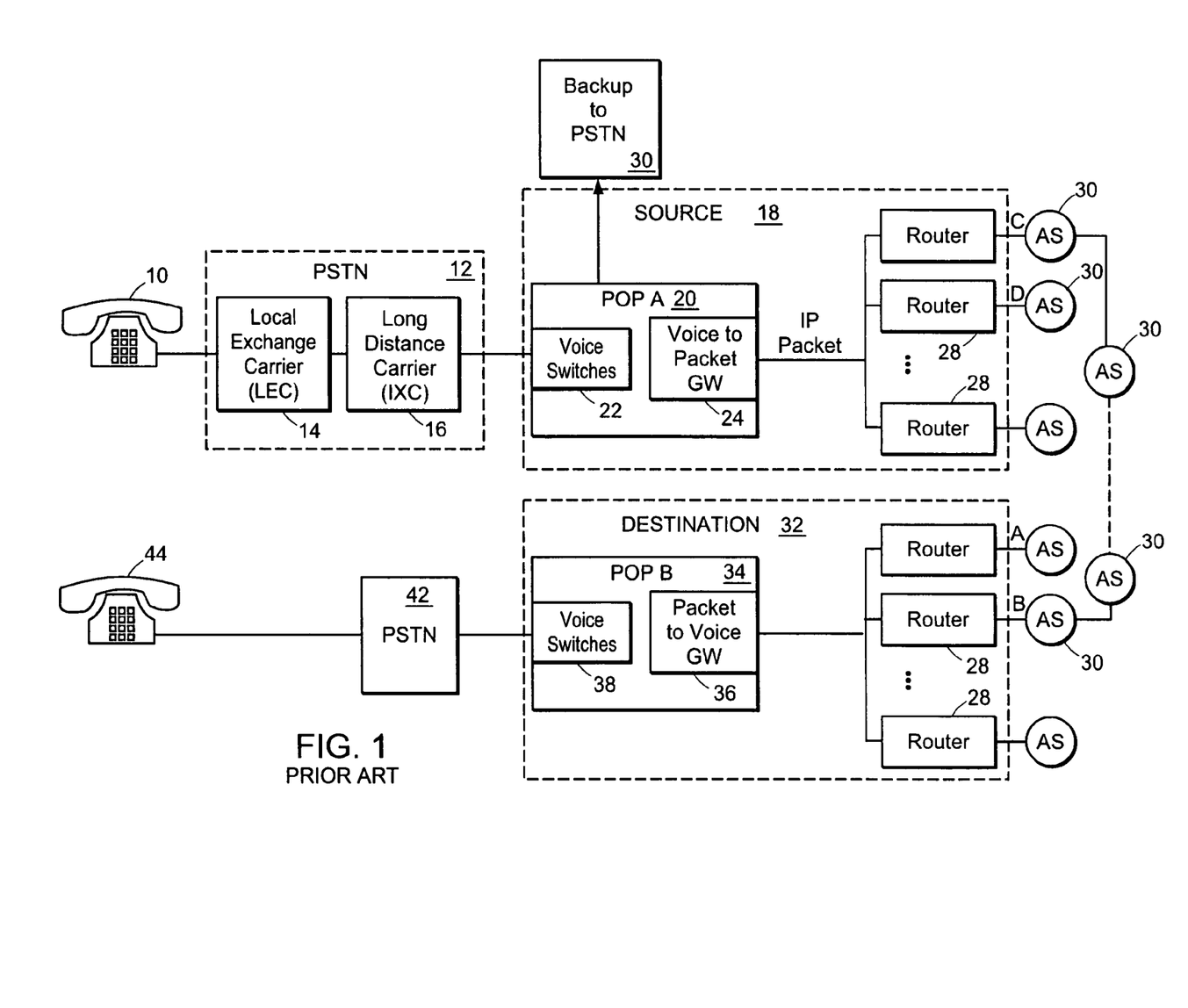
FIG. 1 is a block diagram illustrating the components utilized in the end-to-end call where voice is transmitted over the internet.

FIG. 1 illustrates the components utilized in the end-to-end call where voice is transmitted over the internet.

A call begins at a device such as a telephone 10, which connects to a public switched telephone network (PSTN) 12. The PSTN 12 comprises many local exchange carriers (LEC). Here, the telephone or user terminal 10 is connected directly to local exchange carrier 14. The local exchange carrier 14 then connects to long distance carrier (IXC) 12. The long distance carrier 16 then has several options for delivering the voice signal to the destination terminal 44. One of these options is to transmit the voice over internet protocol.

To do so, the long distance carrier 12 connects to an internet source 18, which comprises a Point of Presence (POP) 20. Calls arriving at the POP 20 from various long distance carriers 16 arrive at a voice switch 22 within the POP 20. The switched voice signals are then converted to packets at gateway 34. These internet protocol (IP) packets are then sent to one of several routers or output ports depending on a routing policy and/or announced best routes. Each output port is linked to an autonomous systems (AS) 30, where an AS "is a set of routers under a single technical administration, using an interior gateway protocol and common metrics to route packets within the AS, and using an exterior gateway protocol to route packets to other ASes." See IETF RFC 1930. Thus, each AS is operated by a "carrier" and each carrier may provide different services and charge its own rates.

While en route to a destination 32, the packets may traverse several autonomous systems 30. Each autonomous system encountered is considered a "hop."

The packets then arrives, along with other packets from the same or other sources, at destination routers 28, where they are converted back to voice signals at the receiving POP 34 by a packet-to-voice gateway 36. The voice signals are routed within the POP 34 to voice switches 38 which route the voice channels to a public switched telephone network 42 to which the destination 44 is connected. The call is then routed to the destination terminal 44.

SUMMARY OF THE INVENTION

It is desirable to deliver voice packets over the most efficient path available. Therefore, some way of comparing various paths should be available.

Most systems use a probe which is sent to and returned by the destination. Thus, round-trip information is available, but this then relies, not only on the forward path, but the return path. For a voice message, however, the goal is to get the message to the destination. There is little concern regarding round-trip information when only the first half of the trip is important.

Accordingly, a method for determining an efficient Internet path from among plural paths from a source and a destination includes forwarding multi-packet probes from the source to the destination through different paths. The efficiencies of the different paths are then determined based on information collected from the probes arriving at the destination.

In one embodiment, probe packets contain information which can be used to determine efficiency of taken paths. The efficiencies of the various paths are then determined by comparing the information contained from the various probe packets arriving at the destination.

For example, the information can include sequence information such as a sequence number. Packet loss information, such as the ratio of lost packets to sent packets, can be determined based on the sequence information. Alternatively, a histogram of numbers of sequential packets lost can be determined.

The information can include timing information, such as a timestamp, from which relative latency based on the timing information across different paths can be determined. In addition, jitter for each path based on the timing information for that path can also be determined based on the timing information.

In one embodiment of the present invention, the probes, which may be made up of multiple packets, emulate the data of the application for which they are testing paths. For example, if the application is an audio application, the application data is audio traffic, and the probes would emulate audio traffic. In a particular embodiment of the present invention, the application is a voice application and probes emulate voice traffic.

In one embodiment, a path from the source to the destination is selected according to a routing policy based on packet header information, such as, but not limited to, a destination address, a source address and/or a packet service type.

In one embodiment of the present invention, a method for determining a best route over a network from a source to a destination includes providing plural ingress paths or output ports at the source, each connected to a network access provider. Some output ports may be connected to the same provider, while others are connected to different providers. At the destination, plural egress paths or output ports are provided that similarly connect to plural network access providers, some of which may be the same and some of which are different. Each egress path is assigned a unique set of addresses. Probes are periodically sent from the source to the destination, through different combinations of source ingress paths and destination egress paths. One-way statistics are determined from probes received by the destination. That is, there is no reason to send the probe back to the source. The best route is then determined based on the statistics. Finally, the source, that is, the source itself or an associated server such as a gatekeeper, is reconfigured based on the determined best route, which may be announced to the network.

Several unique addresses are assigned to the destination and are associated with the respective destination egress paths, such that sending a probe to a specific address determined the destination egress path.

A system for determining a most efficient route, from a plurality of routes, over a network from a source to a destination includes, at the source, a probe generator that periodically generates probes addressed to a probe monitor at the destination. The probe generator inserts information into the probes. Different probes are addressed to different addresses assigned to the probe monitor such that the different probes traverse the plurality of routes. At the destination, the probe monitor extracts the information from received probes. An analyzer analyzes the extracted information to determine the most efficient route. Information regarding the most efficient route is returned to the source to control the choice of output port and destination address. Alternatively, the information can be returned to a server associated with the source such as a gatekeeper, or simply announced to the network. By choosing a specific output port and destination address, the source controls at least the first and last autonomous systems in the paths, thereby selecting a route.

In one embodiment, the inserted information is inserted into the data field of a probe packet.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2A:
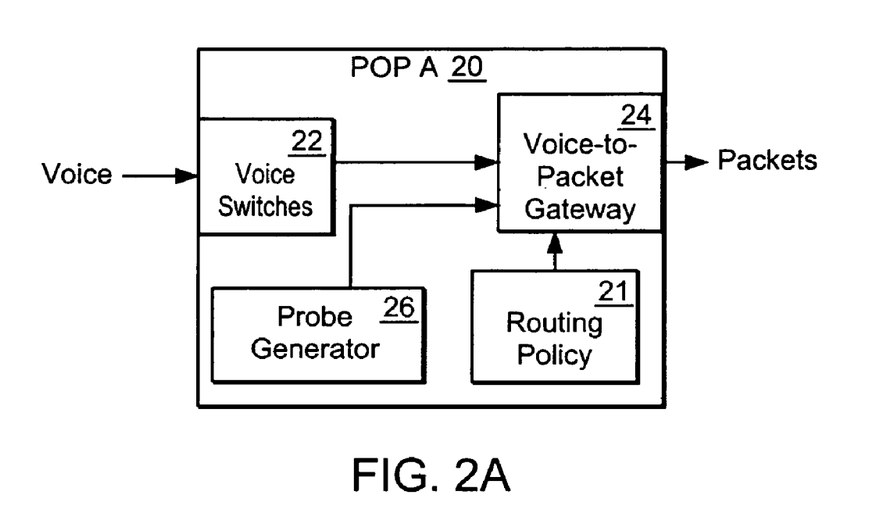
FIGS. 2A and 2B are block diagrams illustrating respectively the source POP and the destination POP of FIG. 1, modified according to an embodiment of the present invention.
Figure 2B:
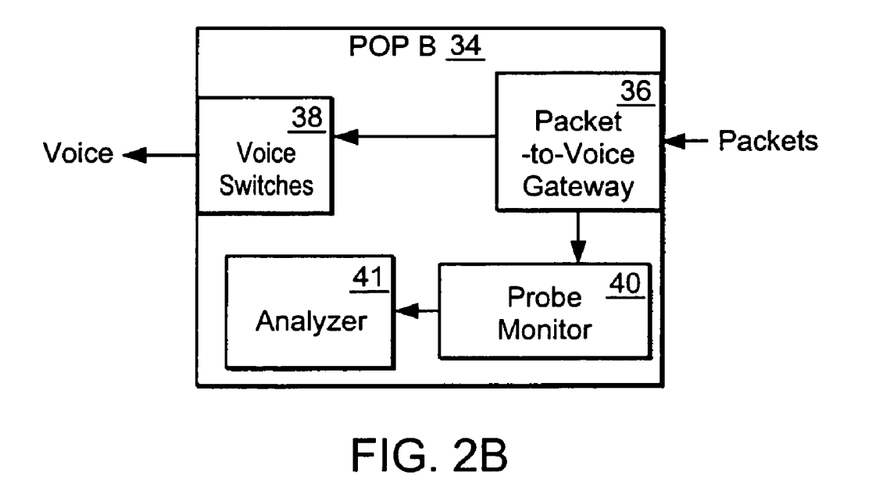

FIGS. 2A and 2B illustrate respectively the source POP 20 and the destination POP 34 of FIG. 1, modified according to an embodiment of the present invention.

To determine a best route for voice over IP packets to take over the internet, a probe generator 26 within the source POP 20 periodically generates a probe. The probe contains sequence information and time stamp information, and is addressed to one of several assigned addresses at the destination. The destination addresses all correspond to a probe monitor 40 located at the destination POP 34, but each destination address is designated to receive packets from a different autonomous system (although redundancy is used for a more robust system), each autonomous system corresponding to a different port. A routing policy 21 at the source POP 20 determines, based on one of several source addresses or host numbers available to the probe generator, from which of the routers 28 (FIG. 1) to send the probe. Thus, the host number combined with the target address determines the at least the starting and ending hops of the route to be taken by the probe.

At the destination POP 34, probe packets addressed to the probe monitor 40 are delivered to the probe monitor 40, which extracts information, such as sequence numbers and timestamps, from the probes.

This information is passed to an analyzer 41 which determines various statistics such as packet loss, relative latency and jitter, described below. From these statistics, the most efficient path of all the tested paths, as defined by various weightings and combinations of these factors, can be determined. The determination of the most efficient path is then used by the source, directly or for example, through an associated gatekeeper, to reconfigure its routing tables for the particular destination.

Figure 3A:
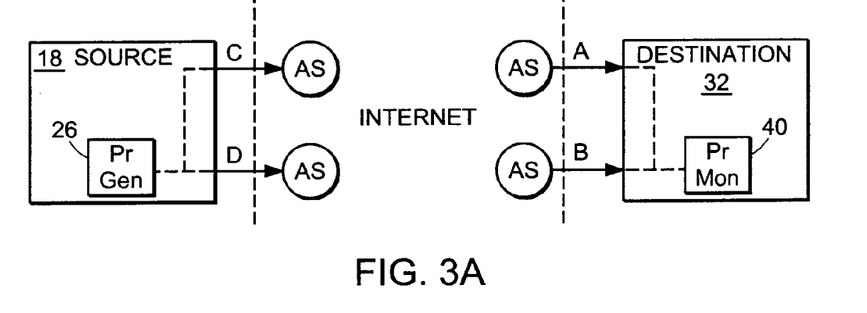
FIG. 3A is a schematic diagram illustrating a simplified version of the system of FIGS. 2A and 2B, where the source and destination each have two ports.

FIG. 3A illustrates a simplified version of the system of FIGS. 2A and 2B, where the source and destination each have two ports. The source 18 has two ingress paths corresponding to output ports, C and D, while the destination 32 has two egress paths corresponding to input ports, A and B. Each input port of the destination 32 is assigned two addresses. For example, input port A may be assigned addresses A1 and A2, while input port B is assigned addresses B1 and B2. These input port addresses correspond to the probe monitor 40 within the destination 32.

At the source 18, the probe generator 26 generates probes addressed to each of the destination addresses A1, A2, B1, B2. Each probe is then routed through one of the ingress paths port C or D, according to the routing policy 21 (FIG. 2), based on the host number and the destination address.

Figure 3B:
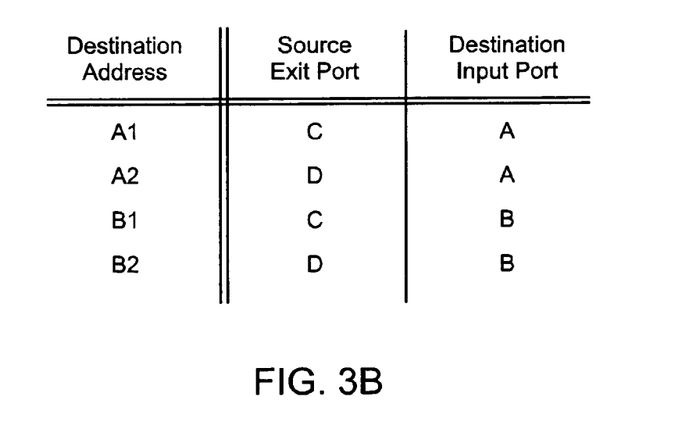
FIG. 3B is a table illustrating the mapping of the destination address to the source and destination input ports for the simplified example of FIG. 3A.

FIG. 3B illustrates the mapping of the destination address to the source and destination input ports. For example, if the destination address of the probe is A1, the exit port from the source may be dictated by the routing policy to be port C, while the input port at the destination is Port A. Similarly, a probe addressed to destination address A2 will exit the source from port D and arrive at destination input port A, and so on.

FIG. 3B provides an example of static routing. Of course, other routing policies may be implemented. For example, the routing policy may be based on other information within the packet header including, for example, destination address, source address, or a combination of source and destination address. In addition, the policy may be based on other information such as service type.

Figure 4:
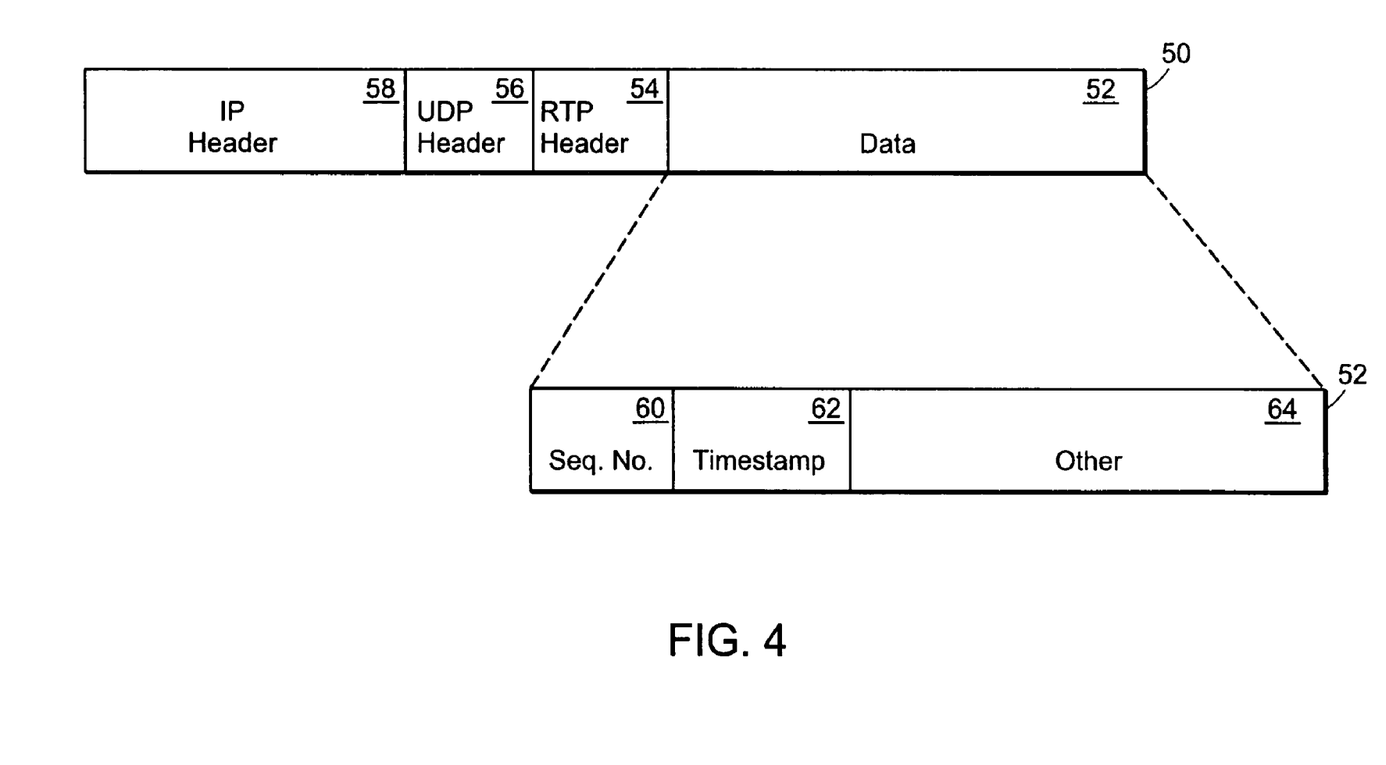
FIG. 4 is a schematic diagram illustrating the format of a probe according to the present invention.

FIG. 4 illustrates the format of a probe 50. To measure performance accurately, the probe is made to emulate packets from the application. In this specific case, probe packets look like voice over IP packets. A probe comprises an IP header 58, followed by a user datagram protocol (UDP) header 56. See for example, RFC 768, "User Datagram Protocol." Following the UTP header 56 is a real time transport protocol (RTP) header 54. See, for example, RFC 1889, "RTP: A transport protocol for real time applications." In accordance with the RTP specification, application data 52 follows the RTP header 54.

In the particular case of probes as used by an embodiment to the present invention, the data 52 includes a sequence number 60 and a time stamp 62. Other information 64 which would be useful in determining the efficiency of a taken path may optionally be used. Although the RTP header 54 includes a sequence number and a time stamp, the probe generator 26 does not have control of these. For accuracy, the probe generator 26 creates its own sequence number and time stamp fields 60, 62 in the data portion 52.

Thus, when a probe is received at the destination 32 by the probe monitor 40, the probe monitor 40 reads the sequence number and time stamp information from the probe's data field, and determines statistics such as packet loss, jitter and latency. From these statistics, a determination can be made as to which of the paths taken by the various probes is the most efficient. This information can then be sent back to the source POP 20 and used to address voice packets to the destination 32 over the path deemed to be the most efficient.

For example, in one embodiment, each route N receives a rating $R_N$ defined as:

$$R_N = 82 - 3 * \frac{(d_N - 50) + (dv_{95,N} - d_N)h}{100} - (4l_N * 100)$$

where 82 is a baseline score for G.729 voice compression with a latency of 50 milliseconds and no loss, and where for route N and $d_N$ is average delay in milliseconds. The delay variation or jitter is $(dv_{95,N}-d_N)$ where $dv_{95,N}$ is the 95th percentile delay from the measurement samples, while h is a scaling factor that accounts for an extra dejitter buffer required at the receiver. Finally, $l_N$ is the percentage of lost packets. The route with the highest rating will generally be selected as the best route.

In another embodiment, the delay variation, measured instead as $(dv_{95,N}-d_{5,N})$ where $d_{5,N}$ is the 5th percentile delay from the measurement samples, is treated as delay up to some threshold. Beyond that threshold, it is treated as loss.

The delay and loss values can be calculated as follows. A series of probes are sent along different paths or routes. For each probe, a delay value is measured as the difference of the receiver timestamp and the sender timestamp. From a collection of measurements for one path, the average as well as the n'th and (100−n)'th percentile values for 0<n<100 are calculated, the latter two measurements providing jitter information.

Of course, conditions change over time, and one path which is the most efficient at one time may no longer be at a later time. Therefore, probes are periodically sent out to continually monitor the Internet for a most efficient route.

Figure 5:
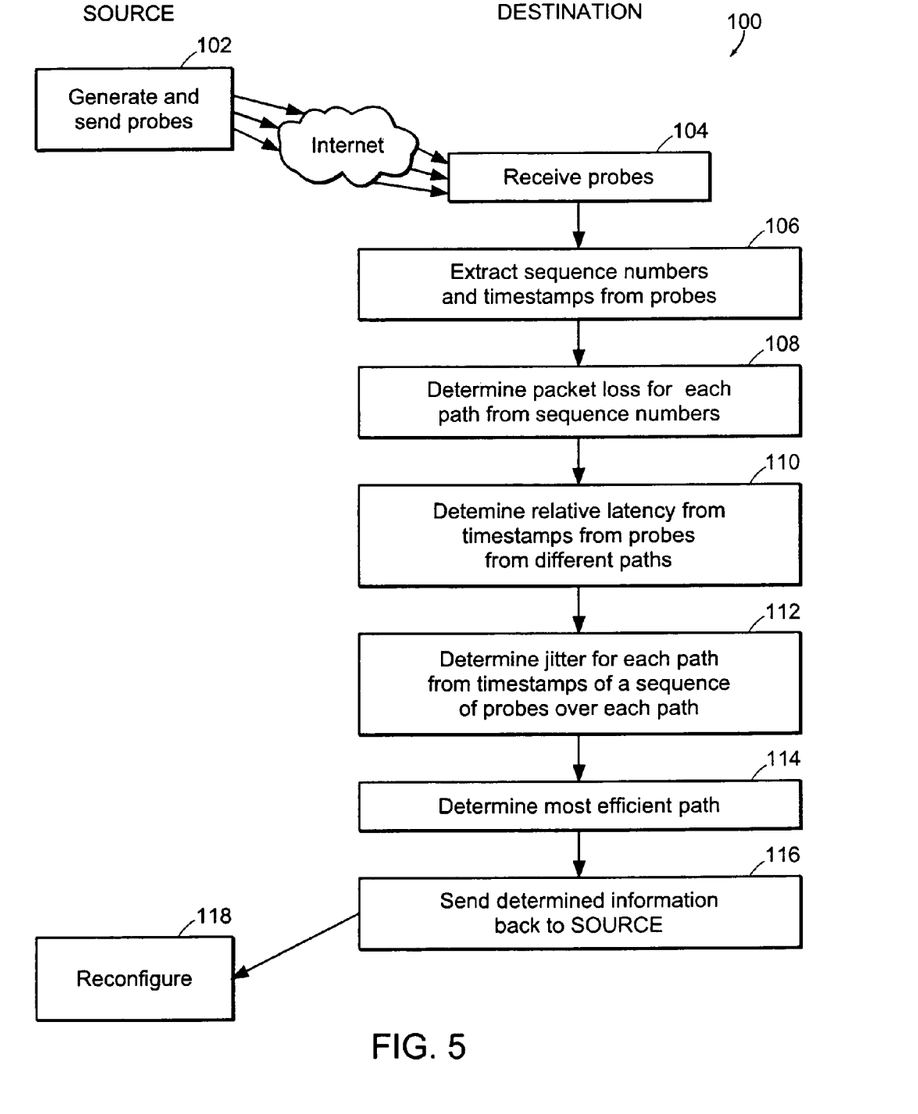
FIG. 5 is a flowchart illustrating a method used by an embodiment of the present invention.

FIG. 5 is a flowchart illustrating a method used by an embodiment of the present invention.

First, in step 102, multiple probes are generated at the source, numbered with a sequence number and timestamped, and sent through the Internet along different paths or routes.

At step 104, the destination receives the probes. Of course, although only a single step is shown, it would be understood by one skilled in the art that the multiple probes will be received at different times, and that some probes might be lost and therefore will never be received at the destination.

At step 106, the sequence numbers and timestamps are extracted from the received probes.

At step 108, packet loss for a given path is determined by examining a history of the sequence numbers of received probes which traveled along that path. The packet loss determination may result in a single number representing the number of lost packets, or may, for example, be retained in a histogram of lost packets. Packet loss determination is performed for each path being analyzed.

At step 110, relative latency of each path with respect to the other paths is determined by comparing the timestamps of probes that traveled along different paths.

At step 112, jitter is determined for a given path by comparing the timestamps of a sequence of probes that traveled along that path. Jitter is determined for each path being analyzed.

At step 114, the most efficient path of the paths being analyzed is determined by comparing packet loss, relative latency and jitter. Each of these factors may be weighted independently, depending on the specific needs of the same at a given time.

At step 116, information including the so-determined most efficient path is sent back to the source, which then may reconfigure itself accordingly, as in step 118. Although step 118 is listed under the source, the most efficient path information could in fact be sent to another system such as a gatekeeper associated with the source. More generally, the most efficient path can be announced to the network.

As one skilled in the art would surely recognize, no specific order is intended in the flowchart of FIG. 5, at least as far as steps 108 through 112 are concerned. In addition, the operations may be intermingled. That is, packet loss for one path could be determined, followed by a jitter determination for another path, followed by a relative latency determination for a subset of the paths, and so on.

Furthermore, it is not crucial that steps 106 through 116 be performed by the destination server. The destination server could, in fact, after receiving the probes, forward them to another server for processing, or do the processing itself and forward the resulting information to another server for the most efficient path determination, for example.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining an efficient Internet route from amount plural routes from a source to a destination, the method comprising:

forwarding multi-packet probes from the source to the destination through the plural routes, wherein each route comprises at least one of a different ingress path and a different egress path; and determining efficiencies of the plural routes based on information collected from the probes arriving at the destination, wherein probe packets contain information which is used to determine efficiency of taken routes, the step of determining efficiencies comprising comparing the contained information of the probe packets arriving at the destination.

2. The method of claim 1, wherein the contained information comprises sequence information.

3. The method of claim 2, comprising:
determining packet loss information based on the sequence information.

4. The method of claim 3, wherein determining packet loss information comprises:
determining a ratio of packets lost to packets sent.

5. The method of claim 3, wherein determining packet loss information comprises:
determining a histogram of numbers of sequential packets lost.

6. The method of claim 1, wherein the contained information comprises timing information.

7. The method of claim 6, further comprising:
determining relative latency based on the timing information across different routes.

8. The method of claim 6, further comprising:
   determining jitter for a route based on the timing information for the route.

9. The method of claim 1, wherein the probes emulate application data.

10. The method of claim 9, wherein an application is an audio application, and application data is audio traffic.

11. The method of claim 10, wherein the audio application is a voice application.

12. The method of claim 1, wherein a route from the source to the destination is selected according to a routing policy based on packet header information.

13. The method of claim 12, wherein the packet header information comprises a destination address.

14. The method of claim 12, wherein the packet header information comprises a source address.

15. The method of claim 14, wherein the packet header information further comprises a destination address.

16. The method of claim 12, wherein the packet header information comprises a service type.

17. A system determining a most efficient route from a plurality of routes over a network from a source to a destination, comprising:
   at the source, a probe generator that periodically generates probes addressed to a probe monitor at the destination, the probe generator inserting information into the probes, wherein different probes are addressed to different addresses assigned to the probe monitor, and wherein the probe generator sends different probes to the probe monitor via different ingress paths onto the Internet to cause the different probes to traverse the plurality of routes;
   at the destination, a probe monitor that extracts the information from received probes; and
   an analyzer that analyzes the extracted information to determine the most efficient route.

18. The system of claim 17, wherein the inserted information comprises a sequence number and a timestamp.

19. The system of claim 17, wherein the inserted information is inserted into a data field within a probe packet.

20. The system of claim 17, wherein the analyzer determines jitter.

21. The system of claim 17, wherein the analyzer determines relative latency.

22. The system of claim 17, wherein the analyzer determines packet loss.

23. The system of claim 17, wherein the different addresses used for the different probes cause the probes to exit the Internet via different egress paths.

24. A method for determining an efficient Internet route from amount plural routes from a source to a destination, the method comprising:
   forwarding multi-packet probes from the source to the destination through the plural routes, wherein each route comprises at least one of a different ingress path and a different egress path and wherein the forwarding step comprises:
      sending a first multi-packet probe from the source to the destination via a first ingress path onto the Internet; and
      sending a second multi-packet probe from the source to the destination via a second ingress path onto the Internet; and
   determining efficiencies of the plural routes based on information collected from the probes arriving at the destination.

25. A method for determining an efficient Internet route from amount plural routes from a source to a destination, the method comprising:
   forwarding multi-packet probes from the source to the destination through the plural routes, wherein each route comprises at least one of a different ingress path and a different egress path and, wherein the forwarding step comprises:
   sending a first multi-packet probe from the source to the destination via a first egress path out of the Internet; and
   sending a second multi-packet probe from the source to the destination via a second egress path out the Internet; and
   determining efficiencies of the plural routes based on information collected from the probes arriving at the destination.

26. A method for determining an efficient Internet route from amount plural routes from a source to a destination, the method comprising:
   forwarding multi-packet probes from the source to the destination through the plural routes, wherein each route comprises at least one of a different ingress path and a different egress path and wherein the forwarding step comprises:
      sending first and second multi-packet probes from the source to the destination via a first ingress path onto the Internet, wherein the first multi-packet probe takes a first egress path out of the Internet and the second multi-packet probe takes a second egress path out of the Internet; and
      sending third and fourth multi-packet probes from the source to the destination via a second ingress path onto the Internet, wherein the third multi-packet probe takes the first egress path out of the Internet and wherein the fourth multi-packet probe takes the second egress path out of the Internet; and
      determining efficiencies of the plural routes based on information collected from the probes arriving at the destination.

27. The method of claim 26, wherein the determining step comprises determining the relative efficiencies of the four different paths traveled by the first, second, third and fourth multi-packet probes based on information collected from the first, second, third and fourth multi-packet probes.

* * * * *